(No Model.)

W. T. MESSINGER.
PIPE COUPLING AND CHECK VALVE.

No. 455,633. Patented July 7, 1891.

Witnesses
Jas. J. Maloney
A. J. Locke

Inventor.
William T. Messinger
by Jno. P. Livermore
Att'y.

THE NORRIS PETERS CO., PHOTO-LITHO., WASHINGTON, D. C.

UNITED STATES PATENT OFFICE.

WILLIAM T. MESSINGER, OF BOSTON, ASSIGNOR TO GEORGE D. WILDES, OF IPSWICH, MASSACHUSETTS.

PIPE-COUPLING AND CHECK-VALVE.

SPECIFICATION forming part of Letters Patent No. 455,633, dated July 7, 1891.

Application filed April 1, 1891. Serial No. 387,249. (No model.)

*To all whom it may concern:*

Be it known that I, WILLIAM T. MESSINGER, of Boston, county of Suffolk, State of Massachusetts, have invented an Improvement in Pipe-Couplings and Check-Valves, of which the following description, in connection with the accompanying drawings, is a specification, like letters on the drawings representing like parts.

This invention is embodied in a pipe-coupling and check-valve in which the check-valve is contained in a removable cylinder interposed between the ends of two coupling-pieces and inclosed within the coupling-nut, by which the said coupling-pieces are clamped against the interposed cylinder.

In the device forming the subject of this invention the removable cylinder or ring supports within it a piece containing the valve-seat and guide for the valve. The valve-guide and seat-piece are shown in one instance as screwed into the removable cylinder, and by having the valve-seat and guide formed in a single piece separate from the cylinder, as described, it is much more easily and perfectly finished than when the valve-seat and valve-stem guide are in separate pieces, which when put together constitute a removable chamber which incloses the valve. As shown in this instance, the valve proper is concave or cup-shaped, and is provided with an axial stem for supporting and guiding it, while the seat-piece has a raised guide, in which the stem works and which is connected by arms with the annular valve-seat.

Figure 1:
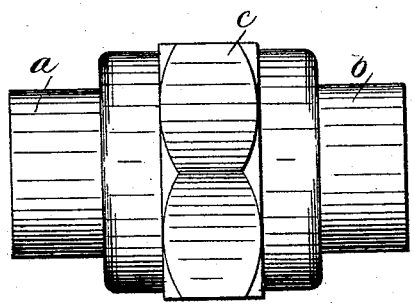
Figure 2:
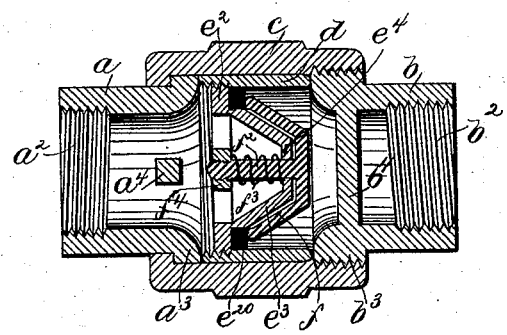
Figure 3:
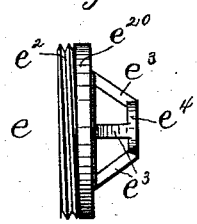
Figure 4:
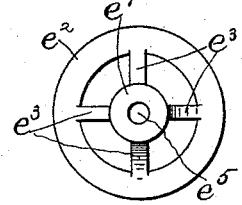
Figure 5:
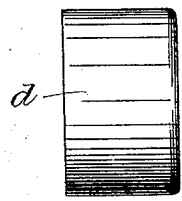
Figure 6:
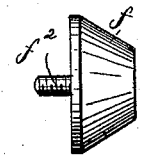

Figure 1 is a side elevation of a combined coupling and valve embodying this invention. Fig. 2 is a longitudinal section thereof. Figs. 3 and 4 are a side elevation and plan view of the valve-seat and guide-piece attached. Fig. 5 is a side elevation of the removable cylinder; Fig. 6, a side elevation of the valve proper, and Fig. 7 a sectional view showing a modified construction of the removable cylinder and co-operating parts.

Figure 7:
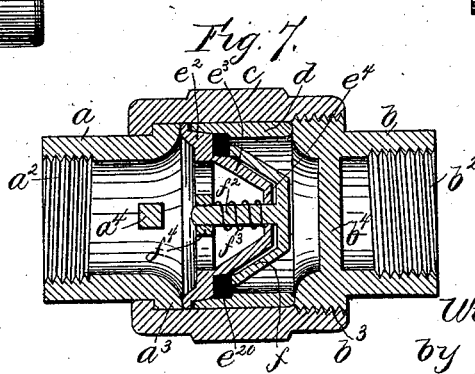

The device forming the subject of this invention comprises two coupling-pieces $a$ $b$, adapted to be connected with the ends of a pipe to be coupled together, as by the internal screw-threads $a^2$ $b^2$. One of the said coupling-pieces is provided with a flange or shoulder $a^3$ and the other with an external threaded portion $b^3$, which portions co-operate with the coupling-nut $c$, which, instead of drawing the coupling-pieces $a$ and $b$ into direct engagement with one another or against a simple interposed washer, causes the said coupling-pieces to be tightly pressed against the ends of an interposed cylinder $d$, (see Figs. 2 and 5,) which cylinder fits loosely inside the coupling-nut $c$, and, as shown in Fig. 2, engages at its ends with the coupling-pieces $a$ $b$, so that when the coupling-nut is turned up tight the coupling-pieces are pressed tightly against the ends of the said cylinder $d$ and make a tight joint therewith. Said cylinder is hollow and constitutes a support or holder for the valve-seat and guide-piece $e$, composed mainly of an annular base $e^2$, which constitutes the valve-seat proper or part against which the valve rests in order to prevent the flow of fluid through the cylinder and pipes connected therewith except in one direction. Said annular base $e^2$ is open at its middle to permit the fluid to flow when the valve is unseated, and has connected with it by a number of inclined arms $e^3$ a guide-piece $e^4$, having a guide-passage $e^5$, in which the stem of the valve proper works. Said valve-guide and seat-piece are shown in Figs. 2 and 3 as externally threaded, so as to screw into a corresponding internal thread in its holding-cylinder $d$, as shown in Fig. 2, and the piece $e^2$ may either constitute the seat with which the valve directly engages, or may be used to support a seat of softer and more yielding material, as illustrated at $e^{20}$, Fig. 2, in which case the soft seat is clamped between the annular base $e^2$ and a suitable shoulder formed at the inside of the cylinder $d$. The valve proper $f$ (see Figs. 2 and 6) is shown as cup-shaped, so as to receive within it the arms $e^3$ and guide-piece $e^4$, as shown in Fig. 2, said valve having the central stem $f^2$, which works in the guide-opening $e^5$, and which may be, if desired, acted upon by a light spring $f^3$, (see Fig. 2,) interposed between the guide and a suitable nut or head $f^4$, formed at the end of the said valve-stem or said spring, being otherwise engaged with the stem, so that it tends to hold the valve lightly pressed against its seat, except when the valve is lifted or unseated by the flow of fluid through the valve-seat toward the under surface of the valve. The coupling-pieces $a$ $b$ are provided with cross-bars $a^4$ $b^4$, one of which serves as a stop to limit the movement of the valve away from its seat, or, in other words, to arrest the valve when opened by the flow of fluid in a position to afford a free passage for the fluid. By having the cross-bars on both pieces the proper one will serve as a stop when the valve-seat-holding cylinder $d$ is introduced in the position desired to properly control the fluid in any given case. The inclined arms $e^3$, that connect the valve-stem guide with the annular valve-seat, also tend to form a guide by engagement with the inner edge of the cup-shaped valve as the latter approaches its seat, thus guiding the edge of the valve into proper position on the annular seat, in case the stem $f^2$ works somewhat loosely in its guide-passage. By having the seat portion and valve-stem guide made in a single piece, which is separate and detachable from its supporting-cylinder $d$, as shown, the seat and guide-surfaces can be made much more easily and with greater accuracy than if one of the said parts were made integral with the cylinder $d$ and the other in a separate piece detachable from but connected with the said cylinder. The cylinder $d$ and inclosed valve and its seat and guide-piece may be easily removed when required for repairs or for any other reason by simply unscrewing the coupling-nut $c$ and slipping it back over the coupling-piece $a$, when the cylinder $d$ can be readily moved sidewise from between the coupling-pieces and again returned after the proper inspection or repairs have been made. As the only parts that require accurate fitting relative to one another for the operation of the instrument are formed in the piece $e$, that is separable from the cylinder $d$, it is obvious that if said working parts—such, for example, as the seat-surface or the valve-stem guide—should become damaged the instrument may be repaired by merely inserting a new seat and guide-piece in the same holding-cylinder that had been used before, as there is no necessity for accurate fitting between the cylinder and guide-piece, as would be required if the cylinder itself had either the valve-stem guide or the valve-seat made integral with it, while the other of the said elements was made in the detachable piece. If desired, one of the coupling-pieces may engage with the valve-seat and guide-piece $e$, instead of with the adjacent end of the chamber $d$, as shown in Fig. 7, in which the detachable guide and seat piece is shown as engaged with its holding-cylinder by a tapering surface instead of by screw-threads.

I claim—

1. The combination of a pair of coupling-pieces and a co-operating coupling-nut with a removable cylinder contained within said coupling-nut and between said coupling-pieces, a guide and seat piece having a valve-seat and valve-guide integrally formed therein, and a valve co-operating with said valve-guide and seat-piece, which latter is detachably connected with the said removable cylinder, substantially as and for the purpose described.

2. The combination of a pair of coupling-pieces and co-operating coupling-nut with a removable hollow cylinder contained between said coupling-pieces and within said coupling-nut, a valve-seat and guide-piece separable from but engaged with said cylinder and comprising an annular seat portion, inclined guide-arms, and a guide-piece having a guide-passage, and a cup-shaped valve having a stem working in said guide-passage, substantially as described.

3. The combination of a pair of coupling-pieces, one provided with an internal cross-bar, with a coupling-nut and a removable cylinder contained between said coupling-pieces and within said coupling-nut, the valve-guide and seat-piece detachable from but supported in said cylinder, and a valve co-operating therewith, as described, the said cross-bar of the said coupling-piece constituting a stop to limit the movement of the valve from its seat, substantially as set forth.

In testimony whereof I have signed my name to this specification in the presence of two subscribing witnesses.

WILLIAM T. MESSINGER.

Witnesses:
JOHN H. MORISON,
JAS. J. MALONEY.